United States Patent
Stryker

(10) Patent No.: US 9,552,914 B2
(45) Date of Patent: Jan. 24, 2017

(54) SIMULTANEOUS MAGNETIC BALANCING OF TWO POINTS

(71) Applicant: Apple Inc., Cupertino, CA (US)

(72) Inventor: James A. Stryker, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/716,799

(22) Filed: May 19, 2015

(65) Prior Publication Data

US 2016/0343493 A1 Nov. 24, 2016

Related U.S. Application Data

(63) Continuation of application No. PCT/US2015/031521, filed on May 19, 2015.

(51) Int. Cl.
*H01F 7/02* (2006.01)
(52) U.S. Cl.
CPC ..................... *H01F 7/021* (2013.01)
(58) Field of Classification Search
CPC ....................................................... H01F 7/021
See application file for complete search history.

(56) References Cited

U.S. PATENT DOCUMENTS

| | | | | |
|---|---|---|---|---|
| 4,544,904 A | * | 10/1985 | Tarachand | H01F 7/021 252/62.57 |
| 2008/0074223 A1 | * | 3/2008 | Pribonic | H01F 7/021 335/306 |
| 2009/0278642 A1 | * | 11/2009 | Fullerton | G01D 18/00 335/284 |
| 2012/0007705 A1 | * | 1/2012 | Fullerton | E05C 19/16 335/306 |
| 2012/0194308 A1 | | 8/2012 | Lauder et al. | |
| 2012/0242440 A1 | * | 9/2012 | Fullerton | E05C 19/16 335/306 |

(Continued)

FOREIGN PATENT DOCUMENTS

JP    EP 1315267 A2 *  5/2003  ............. H01F 7/021

OTHER PUBLICATIONS

International Search Report for PCT Application No. PCT/US2015/031521 issued Feb. 25, 2016.

(Continued)

*Primary Examiner* — Mohamad Musleh
(74) *Attorney, Agent, or Firm* — Downey Brand LLP

(57) ABSTRACT

This application relates to devices in which magnets are arranged so that an intensity of a magnetic field emitted by the magnets is substantially the same at a position of interest for at least two discrete positions of the magnets. The application describes how this can be achieved even when the discrete positions are different distances from the position of interest by identifying locations at which magnetic material can be added to balance the field intensity for both discrete locations. In some embodiments, this type of configuration can be helpful in accommodating movement of magnets between two common positions. When the magnetic field intensity for the position of interest is set near zero a magnetically sensitive component can be positioned at the point of interest with little or no effect from the magnetic field when the magnets are in any of the discrete positions.

19 Claims, 13 Drawing Sheets

(56) References Cited

U.S. PATENT DOCUMENTS

| | | | |
|---|---|---|---|
| 2012/0256715 A1* | 10/2012 | Fullerton | H01F 7/021 335/285 |
| 2013/0176091 A1* | 7/2013 | Lancaster-Larocque | G06F 1/1616 335/306 |
| 2013/0230202 A1 | 9/2013 | Widner et al. | |
| 2014/0043741 A1 | 2/2014 | Smith et al. | |
| 2014/0121855 A1 | 5/2014 | Cretella, Jr. et al. | |
| 2015/0049426 A1 | 2/2015 | Smith et al. | |

OTHER PUBLICATIONS

Written Opinion for PCT Application No. PCT/US2015/031521 issued Feb. 25, 2016.

* cited by examiner

*A-A*

*A-A*

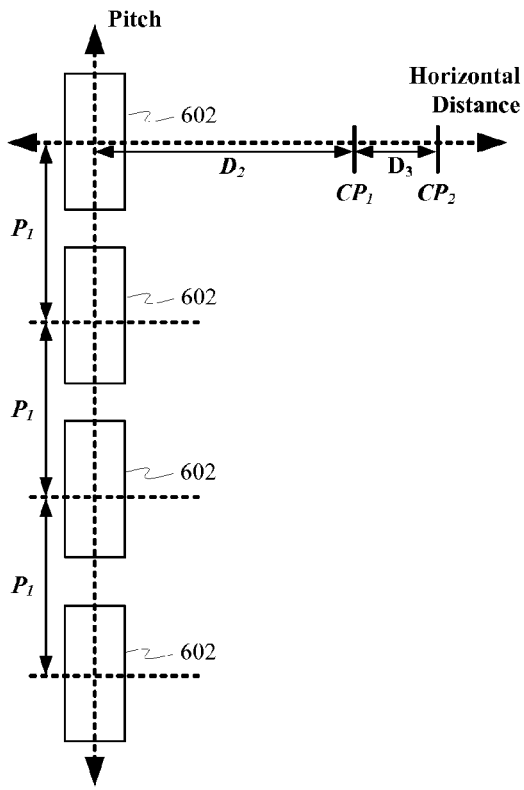
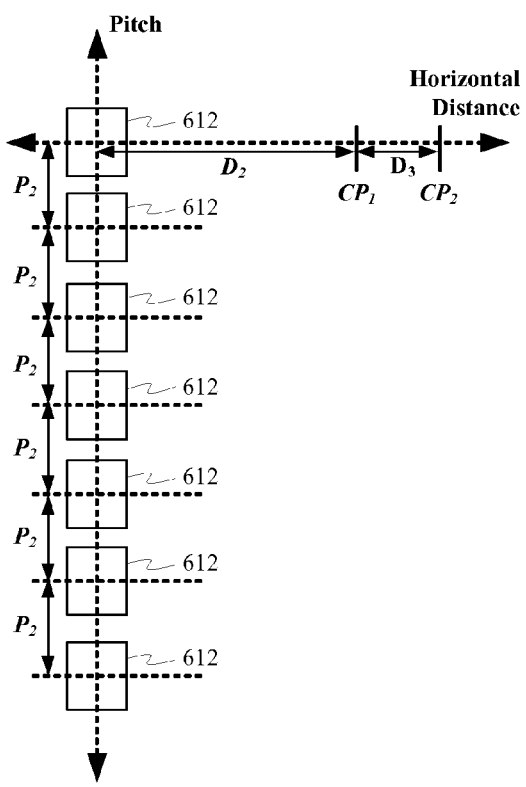
*FIG. 6A*
*FIG. 6B*
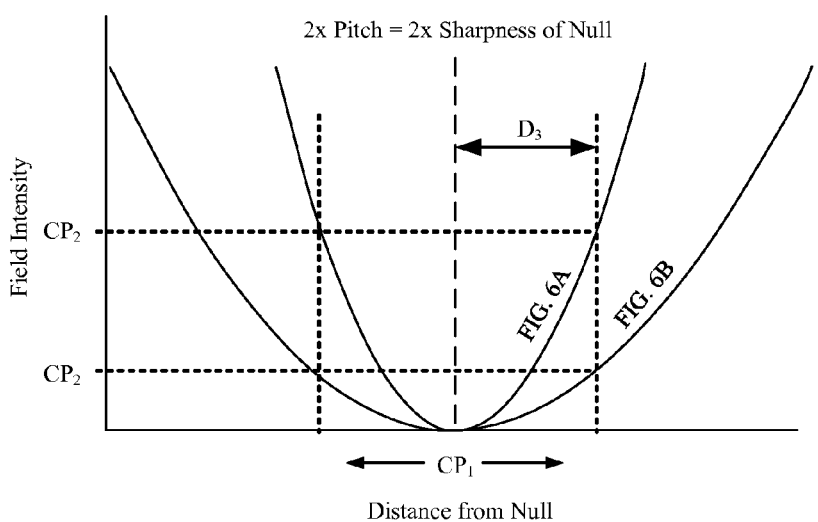
*FIG. 6C*

SIMULTANEOUS MAGNETIC BALANCING OF TWO POINTS

CROSS-REFERENCE TO RELATED APPLICATIONS

This is a continuation of International Application PCT/US15/31521, with an international filing date of May 19, 2015, entitled "SIMULTANEOUS MAGNETIC BALANCING OF TWO POINTS", which is incorporated herein by reference in its entirety. The present application is also related to U.S. application Ser. No. 14/491,583, entitled "BALANCED MAGNETIC ARRAY" filed Sep. 19, 2014 and to U.S. application Ser. No. 13/966,213, entitled "MAGNETIC RELATED FEATURES OF A COVER FOR AN ELECTRONIC DEVICE" filed Aug. 13, 2013, the contents of both applications being incorporated herein by reference in their entirety for all purposes.

FIELD

The described embodiments relate generally to optimizing positions for magnetic arrays in and around electronic devices. More particularly, the present embodiments relate to arranging arrays of magnets so that a device containing the array can transition between at least two configurations while maintaining a magnetic null at a magnetically sensitive component in each configuration.

BACKGROUND

Electromagnetically sensitive sensors within an electronic device can often be affected by other electrical components within the electronic device that emit magnetic fields. Generally the electromagnetically sensitive sensors can be calibrated so that persistent magnetic fields emitted by the device can be largely ignored. Unfortunately, when the magnetic field generating component associated with or built into the electronic device is movable, calibration for the electromagnetically sensitive sensor can be much more challenging. This is particularly true when the magnetic field generating component is a strong magnet as this type of movement can be especially disruptive to the electromagnetically sensitive sensor(s).

SUMMARY

This paper describes various embodiments that relate to designing an array of magnets that emit a magnetic field having two magnetic nulls in particular locations.

A device is disclosed that includes at least the following elements: a substrate that includes a first portion of the substrate that moves with respect to a second portion of the substrate from a first position to a second position; and a magnetic string coupled directly to the first portion of the substrate and comprising a number of magnets oriented so that adjacent magnets of the magnetic string have polarities oriented in opposite directions. An intensity of a magnetic field emitted by the magnetic string is substantially the same at a location external to the device in both the first position and the second position.

An apparatus is disclosed that can be attached to an electronic device. The apparatus includes at least the following elements: a flap, that includes a first portion having a rigid segment and a number of magnets arranged in an alternating polarity pattern along the rigid segment; and a second portion separated from the first portion by a hinge line, the first portion pivoting with respect to the second portion along the hinge line. An intensity of a magnetic field emitted by the magnets is substantially the same in a location that correspond to a magnetically sensitive component disposed within the electronic device when the first portion is in one of a first position and a second position angularly offset from the first position.

A consumer electronic product is disclosed and includes at least the following: an electronic device including a magnetically sensitive component; and a flexible flap pivotally coupled with the electronic device. The flexible flap includes a first portion separated from a second portion by a hinge line. The second portion includes a linear arrangement of magnets having alternating polarities. When the first and second portions of the flexible flap are flat against a protective cover of the electronic device an intensity of a magnetic field emitted by the linear arrangement of magnets at the magnetically sensitive component is substantially the same as the intensity at the magnetically sensitive component when the second portion of the flap is rotated away from the protective cover along the hinge line and contacts the first portion of the flexible flap.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which:

FIGS. 6A-6B show how the pitch of magnetic strings can be varied to adjust an emitted magnetic field;

FIG. 6C shows a graph having lines corresponding to FIGS. 6A and 6B illustrating how the pitch of the spacing of the magnetic material affects a size of a null area of a magnetic field;

DETAILED DESCRIPTION

Figure 1:
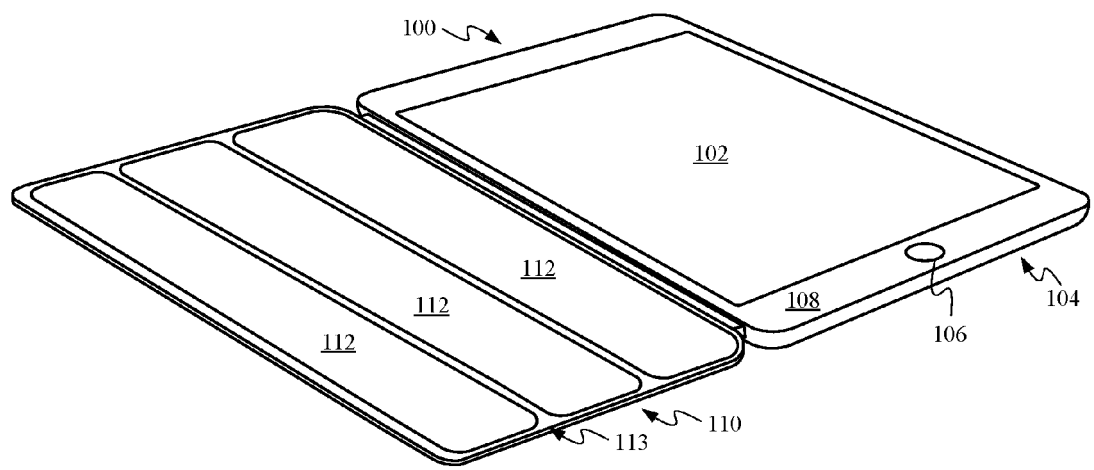
FIG. 1 shows an exemplary device suitable for use with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Integrating magnetic field emitting components into a consumer electronic device can require various design considerations for mitigating any adverse effects caused by the magnetic fields they emit. While electrical components and magnetic sensors can generally be tuned to accommodate persistent magnetic fields associated with a device, when the emitted magnetic field changes or shifts during operation of the electronic device various problems can arise. In particular, magnetic field sensors designed to measure external magnetic fields can be vulnerable to shifting magnetic fields emitted by moving magnetic components, as the shifting magnetic fields can cause substantial errors in measurements performed by the magnetic field sensors. When the magnetic field emitting components primarily occupy discrete positions with respect to a position occupied by a magnetically sensitive component, one solution to the aforementioned problem is to arrange the magnetic field emitting components so that the magnetically sensitive component or components is/are positioned between the discrete positions occupied by the magnetic field emitting components. In this way, a magnitude of the emitted magnetic field can be the same or substantially the same for the magnetically sensitive component for each of the discrete positions. In some embodiments, the emitted magnetic field can be shaped so that the position of the magnetically sensitive component falls within a null area of the emitted magnetic field. Null areas within an emitted magnetic field commonly occur at positions where adjacent magnetic fields cancel each other out. By alternating the polarity of multiple adjacent magnetic field emitting components multiple null areas can be created within the emitted magnetic field. In some embodiments, the magnetic field emitting components can be adjusted so that a magnetic null coincides with a position of the magnetically sensitive components in any one of the discrete positions.

In some embodiments, the device can rely upon multiple magnetic attachment features for coupling to another device. When the attachment features are brought into proximity with magnetic attachment points of another device, the magnetic fields can cooperatively interact based upon their respective properties and result in the devices magnetically attaching to each other in a desired and repeatable manner. For example, due at least in part to the cooperative nature of the interaction of the magnetic fields, the objects can attach to each other in a predetermined position and relative orientation without external intervention. For example, the cooperative magnetic interaction can result in the objects self-aligning and self-centering in a desired orientation without external intervention so that a position of the devices with respect to one another is assured. When this type of coupling allows the devices to move with respect to one another, an intensity of the magnetic field emitted by one device changes or shifts in the other device. By shaping the magnetic field as described briefly above, the magnetic field can be laid out so that one or more magnetically sensitive components experience little or no effect from the emitted magnetic field for common configurations of the device. For example, the magnetic field can be arranged so that in both a fully open and fully closed position, a particular magnetically sensitive component experiences little or no effect from the magnetic field.

The devices can take many forms and perform many functions. In one embodiment, at least one device can take the form of an accessory device. The accessory device can be magnetically attached to at least one electronic device having a relatively large display in proportion to the overall size of the electronic device (a tablet device is one example). The accessory device can provide services and functions that can be used to enhance the operability of the electronic device. For example, the accessory device can take the form of a protective accessory cover that can be magnetically attached to the electronic device. The protective accessory cover can provide protection to certain aspects (such as a display) of the electronic device while enhancing the overall look and feel of the electronic device. The protective accessory cover can also provide support features that enhance a user interaction with the electronic device. For example, the protective accessory cover can be folded into a shape(s) that can support the electronic device in a various display modes. One such display mode can position the display at an angle with respect to a horizontal support surface that is optimal for presentation of video content by the display.

The protective accessory cover can include at least a flexible hinge portion. The flexible hinge portion can include a flexible body that, in turn, incorporates a magnetic attachment mechanism that can include a number of magnets. A magnetic field provided by the magnets can interact with a corresponding magnetic field provided by magnets in the electronic device to magnetically attach the protective accessory cover and the electronic device in a specific orientation and relative position. In other words, the magnetic attachment mechanism can provide both coarse and fine alignment between the protective cover and the electronic device. The protective accessory cover can include a flap made of a substrate that is connected to the flexible hinge portion arranged to smoothly rotate about a pivot line. In one embodiment, the flap can rotate 180° in a first direction towards the display and can rotate 180° in second direction opposite the first direction away from the display. When magnetically coupled to the electronic device, the smooth rotation of the flap about the pivot line in the first direction can bring the flap in contact with the display whereas smooth rotation about the pivot line in the second direction can bring at least a portion of the flap in contact with a rear portion of the electronic device. The protective accessory cover can overlay all or portions of the display depending upon a folded configuration. For example, in a first folded configuration, the protective accessory cover can be folded in a manner that a portion of the display is uncovered and therefore viewable. The flap can be segmented by which it is meant that the flap can be divided into distinct portions that can fold and bend with respect to each other as well as the electronic device and in particular, the display. For example, one distinct portion of the flap can rotate about a hinge line with respect to another distinct portion of the flap. In this way, the segmented flap affords an additional option of revealing only specific portions of the display by folding individual segments to reveal a corresponding portion of the display while other segments remain in contact and therefore obscuring corresponding portions of the display.

This configuration in which various distinct portions of the flap fold and bend with respect to each other causes the problem described above when magnets are disposed within the flap and emit substantial magnetic fields that can adversely bias sensors or electronics. In certain situations, which will be described in additional detail below a position of the sensor and/or the magnets within the accessory device can be adjusted so that a magnetic field exerted at a magnetically sensitive point can be kept substantially the same for at least two distinct magnet positions.

These and other embodiments are discussed below with reference to FIGS. 1-8; however, those skilled in the art will readily appreciate that the detailed description given herein with respect to these figures is for explanatory purposes only and should not be construed as limiting.

FIG. 1 shows an exemplary electronic device 100. As depicted, electronic device 100 can take the form of a tablet device. In some embodiments, electronic device 100 can include display assembly 102 positioned within a housing 104. Housing 104 can be formed of any number of substantially rigid materials along the lines of aluminum, plastic, or steel and can provide protection for various internal components disposed within housing 104. In some embodiments, electronic device can include any number of user interface elements including for example button 106 that extends through protective cover 108, which overlays and provides protection for display assembly 102. In some embodiments, display assembly 102 can provide another means of controlling and manipulating content presented by electronic device 100. For example, a touch sensitive sensor can overlay display assembly 102 and allow a user of electronic device to directly manipulate objects appearing upon display assembly 102. Electronic device 100 can include various other features such as additional buttons and switches as well as I/O ports for interacting and exchanging data with electronic device 100 and other electronic devices or peripherals.

FIG. 1 also depicts accessory device 110 which can be pivotally coupled with electronic device 100 to take the form of a consumer electronic product. In some embodiments, electronic device 100 can be coupled to accessory device 110 by way of a number of magnets. In some embodiments, accessory device 110 can take the form of a flexible substrate 113. For example accessory device can be a flap having a number of rigid segments 112 that assist in shaping the accessory device into any one of a number of support configurations. For example, accessory device 110 can be arranged in a triangular formation to support electronic device 100 in various orientations. Rigid segments 112 can be embedded within accessory device 110. In some embodiments, at least a portion of accessory device 110 can be covered with a cosmetic layer of fabric that maintains a position of each of rigid segments 112 with respect to one another. In addition to the support function discussed above, rigid segments 112 can also be configured to allow a user of electronic device 100 to uncover a predetermined amount of display assembly 102. For example, when accessory device 110 completely overlays protective cover 108, folding back a first one of rigid segments 112 can uncover a small amount of display assembly 102. Furthermore, folding back two of rigid segments 112 can expose even more of display assembly 102. In some embodiments, electronic device 100 can be configured to display content only on those portions of display assembly 102 that are uncovered.

Figure 2:
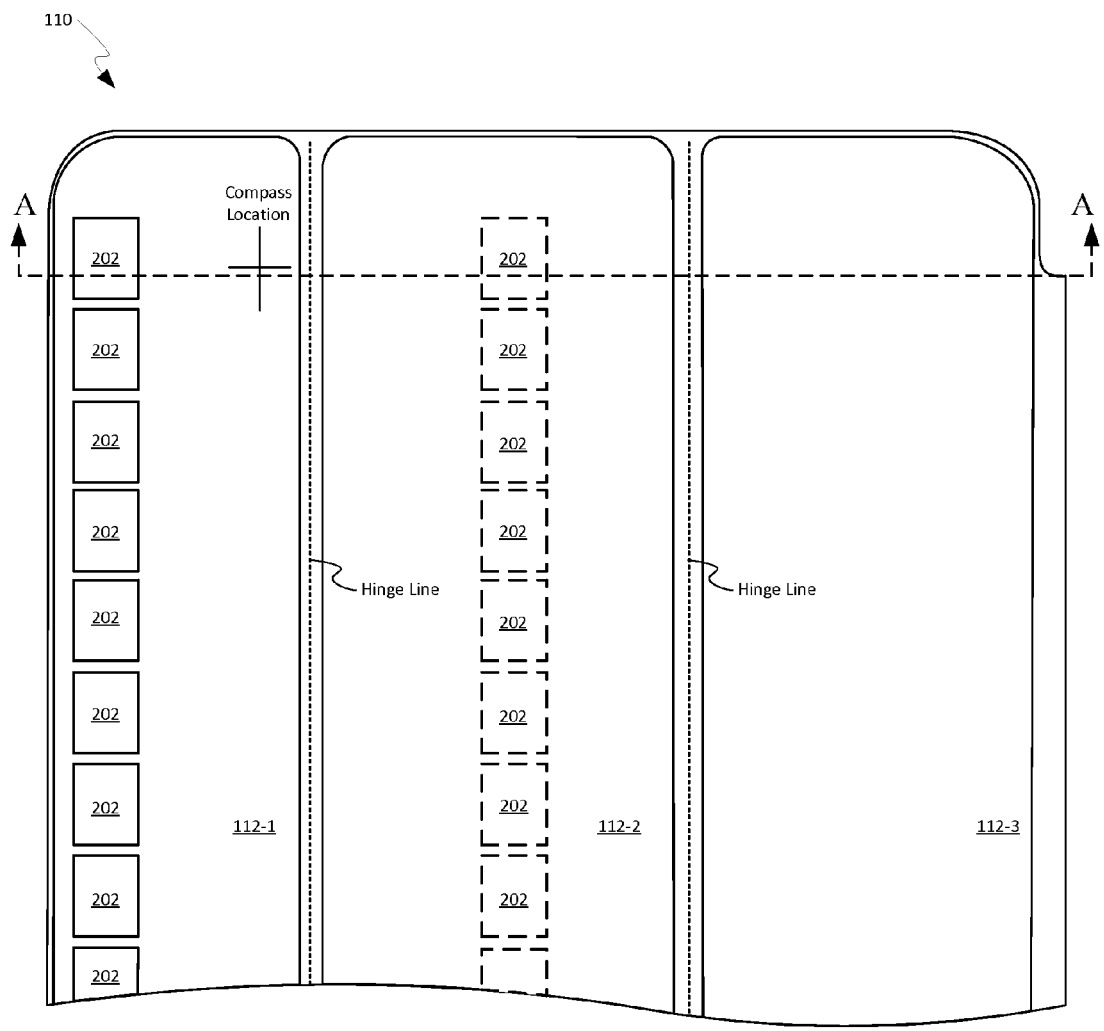
FIG. 2 shows an upper portion of an accessory device with a magnetic string disposed therein.

FIG. 2 shows a close up view of an upper portion of accessory device 110. In particular, FIG. 2 shows how a group of magnets 202 (indicated by solid rectangular boxes) can be arranged within accessory device 110. In some embodiments, the magnetic field emitted by magnets 202 can be operable to secure a portion of accessory device 110 surrounding rigid segment 112-1 against protective cover 108. Magnets 202 can be arranged in a magnetic string formation in which each of magnets are linearly disposed with respect to one another. In some embodiments, the linear disposition just means that a line can be drawn through at least a portion of each of the magnets in the magnetic string. For example, some of magnets 202 can be shifted laterally to optimize a shape and/or size of the magnetic field emitted by magnets 202. In some embodiment, a magnetic field emitted by magnets 202 can be customized by the way magnets 202 are magnetized. The cross marks a position of a magnetically sensitive component disposed beneath accessory device 110. In some embodiments, the magnetically sensitive component can take the form of a compass sensor disposed within housing 104 of electronic device 100. The position of the cross shows how far away magnets 202 are from the compass sensor in both the flat configuration indicated by the solid lines and in the bent configuration indicated by the dashed lines. As depicted, magnets 202 are substantially farther from the compass location in the bent configuration than in the flat configuration. By shaping the magnetic field a magnetic field intensity at the compass location can be substantially the same in both the flat configuration and the bent configuration.

In some embodiments, magnets 202 can be arranged in such a way that the individual magnetic elements can be arranged in an alternating magnetic polarity pattern (P1, P2, P1, P2 . . . ; where P1 represents a first polarity such as North and P2 represents a second polarity opposite that of P1 such as South). While FIG. 2 shows the individual magnets 202 to be equally spaced apart, the spacing between the individual magnets can vary. In some cases, as in the depiction of FIG. 2 the individual magnets 202 can be characterized as having about the same size, shape and mass. In other cases, the individual magnetic elements can vary in size, shape and mass or any combination thereof.

Figure 3A:
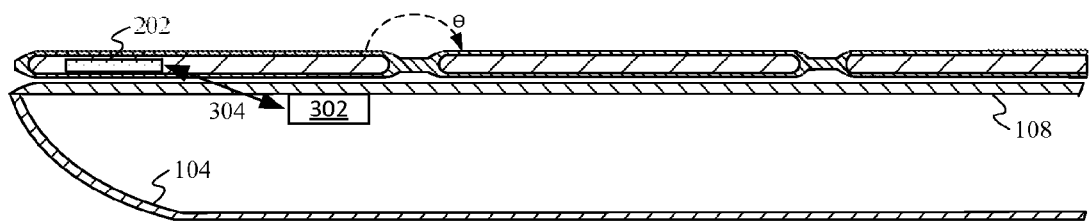
FIGS. 3A-3B show cross-sectional side views of the exemplary device depicted in FIG. 1.
Figure 3B:
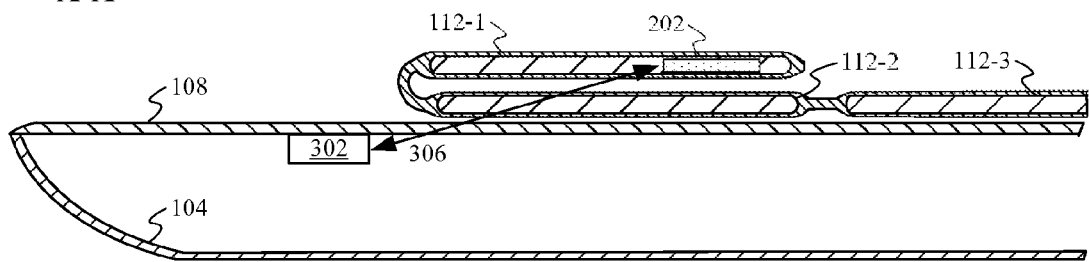

FIGS. 3A-3B show cross-sectional views of accessory device 110 in accordance with Section Line A-A of FIG. 2. In FIGS. 3A-3B, accessory device 110 is depicted covering at least a portion of protective cover 108. FIG. 3A shows accessory device 110 in a flat configuration in which accessory device 110 completely covers protective cover 108. Compass 302 is shown adhered to an interior facing surface of protective cover 108; however, it should be noted that compass 302 can be positioned within electronic device 100 in any number of manners. For example compass 302 can also be affixed to an interior facing surface of housing 104. FIG. 3A also shows how magnet 202 can be embedded within rigid segment 112-1 first distance 304 from compass 302. It should be noted that magnet 202 could alternatively be attached to an exterior surface of rigid segment 112-1. In FIG. 3B rigid segment 112-1 is shown after having been folded away from protective cover 108 and adjacent to rigid segment 112-2 in a folded configuration. While not depicted in this manner, in some embodiments a portion of accessory device 110 surrounding rigid segment 112-1 can be in direct contact with a portion of accessory device surrounding rigid segment 112-1. As depicted, second distance 306 between magnet 202 and compass 302 is clearly larger than first distance 304. Additionally, both first and second distances 304 and 306 represent lateral and vertical offsets from compass 302.

Figure 4A:
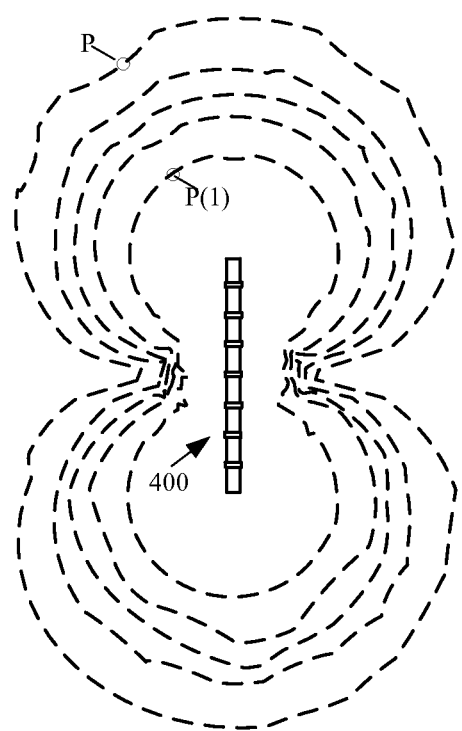
FIGS. 4A-4C show how magnetic fields emitted from a magnetic string can be adjusted by changing a volume of at least one of the magnets of the magnetic string.
Figure 4B:
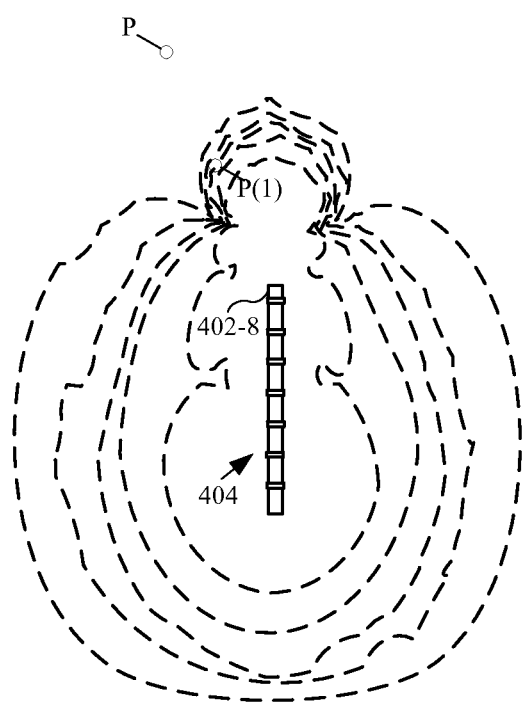
Figure 4C:
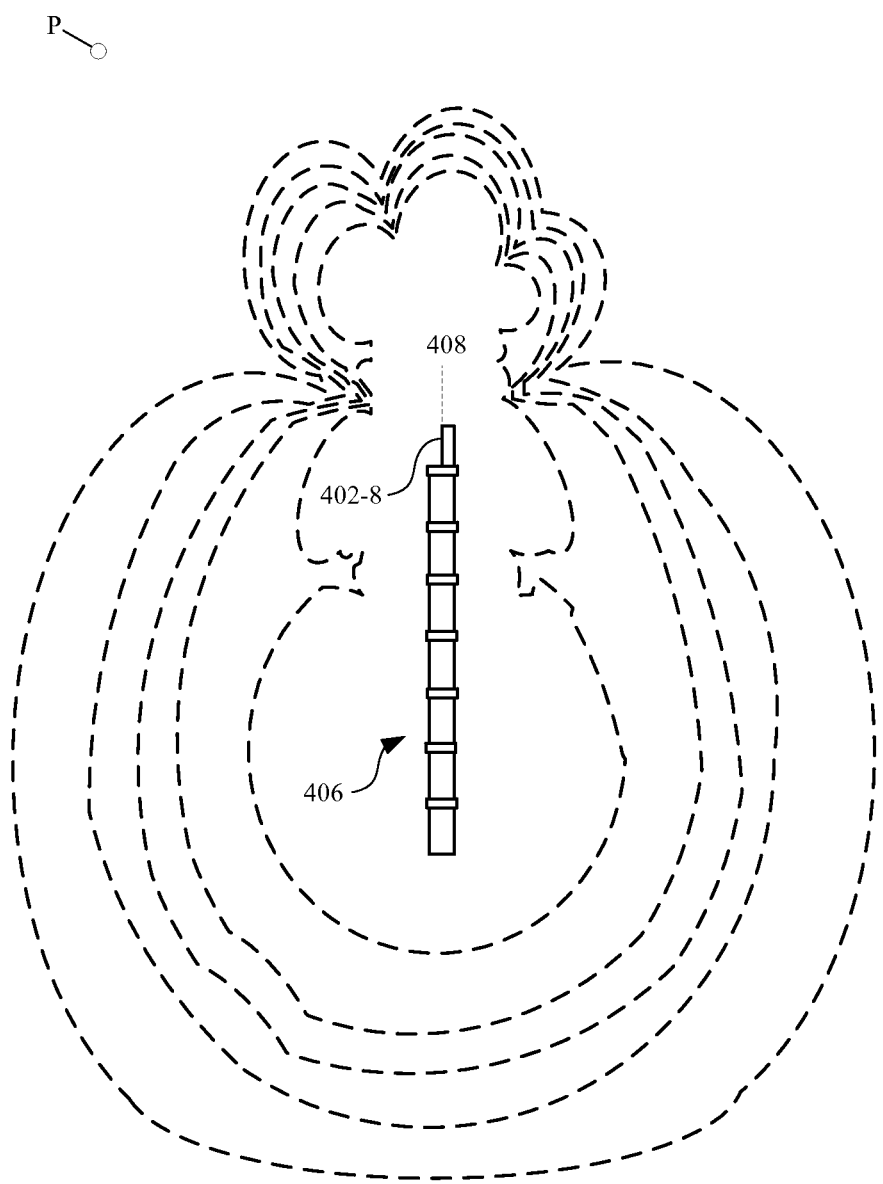

FIGS. 4A-4C show different ways in which a magnetic field emitted by magnetic string 400 made up of a number of magnets 402 arranged in an alternating magnetic polarity pattern can be adjusted by varying a configuration or layout of magnets 202 in accordance with the following magnetic string tuning equation (described in further detail in U.S. patent application Ser. No. 14/491,583 and entitled "BALANCED MAGNETIC ARRAY", which is incorporated herein by reference):

$$0 = V_m/x_m^3 + \Sigma_1^{m-1} \pm V_i/x_i^3. \quad \text{Eq. (1)}$$

In Eq(1) $V_i$ represents volume for each of m−1 magnets 402, $x_i$ represents a distance between each of the m−1$^{th}$ magnets 402 of magnetic string 400 and a position of interest where a magnetic null is desired, $V_m$ represents volume for a compensating magnetic element and $x_m$ represents a distance between the compensating magnetic element and the position of interest at which a null magnetic value is desired. FIG. 4A shows a magnetic string 400 made up of a number of magnets 402. A simulation of a magnetic field provided by magnetic string 400 is depicted by a number of iso-contour lines. As shown, each iso-contour line can represent a magnetic field strength generally described in terms of Tesla (T) or in this case, micro-Tesla (μT). More particularly, magnetic string 400 shown in FIG. 4A has 8 magnetic elements (i.e., 402-1 to 402-8) so that magnetic field strength H(p) at point P(1) can be on the order of about 250 μT whereas the magnetic field strength at point P can be on the order of 20 μT. This type of configuration can result in the magnetic field having a substantially symmetric yet highly variable arrangement. However, FIG. 4B shows magnetic string 404 formed by modifying magnetic string 400 of FIG. 4A by, in this embodiment, reducing a volume $V_1$ of magnetic element 402-8 nearest point P (thereby having the greatest effect on the local magnetic properties associated with point P), magnetic field strength H(P) at point P can be substantially reduced to close to zero (0 μT). In this way, magnetically sensitive components proximate to point P can operate substantially free of magnetic interference emitted by magnetic string 404.

Moreover, FIG. 4C shows another magnetic string 406 having 8 magnetic elements where modification of a volume $V_2$ of magnetic element 402-8 can be carried out by removing magnetic material closest to point P (i.e., material on the side of a centerline 408 of magnetic element 402-8 is removed). This can provide a desirable reduction in magnetic field intensity close to zero as described in FIG. 4B. Additionally, asymmetric removal of magnetic material volume from magnetic element 402-8 causes the magnetic field to be shifted to one side so that the magnetic strength in some areas undergoes a substantial change as magnetic string 406 is rotated. In some embodiments, the magnetic field emitted from a magnetic string can be adjusted in other ways. In some embodiments, at least one magnet within the magnetic string can be configured with a magnetic shunt that redirects energy of the magnetic field in a particular direction. For example, one or two magnets can be configured with magnetic shunts that redirect portions of the magnetic field away from magnetically sensitive components. This type of field direction can be utilized alone or conjunction with the previously discussed techniques to achieve a desirable magnetic field. Alternatively, the magnetic fields emitted by the magnets can be shaped to conform with a desired magnetic field layout. Rare earth element magnets in particular can be configured with particularly complex magnetic fields to achieve a desirable magnetic field configuration.

If magnetic field intensity is desired to be controlled simultaneously at two positions from a magnetic string, a location can be calculated for which if adjustments are made for one position as described above the second position is inherently equivalently adjusted. Because magnetic field intensity is proportional to one over a cube of the distance between the magnet and a position at which the magnetic field acts, Eq(2) describes a relationship between field intensity of a magnetic field emitted by a magnet acting at two different distances. $CP_1$ and $CP_2$ represent magnetic field intensity at the position of interest (i.e. Compass Position) when the magnets are in first and second locations respectively. Eq(3) can provide a distance $D_2$ between an additional balancing magnet and the two specific field intensities and one distance.

$$\frac{\text{Magnetic Field Intensity } (CP_1)}{\text{Magnetic Field Intensity } (CP_2)} = \frac{D_2^3}{D_1^3} \quad \text{Eq (2)}$$

$$D_2 = \sqrt[3]{\left(\frac{CP_1}{CP_2} \times D_1^3\right)} \quad \text{Eq (3)}$$

The aforementioned equations can be used to determine the location for adjustment of a magnetic string to achieve magnetic intensity values at $CP_1$ and $CP_2$ beneath a level at which a magnetically sensitive component at the position of interest is adversely affected. Application of these formulas can define a line along which a desirable distance can be achieved between the second position and the position of interest. Similar to the adjustments used to optimize the magnetic string for one location described in FIGS. 4A-4C, Eq(2) and Eq(3) can help to further optimize the magnetic string to determine locations at which additional magnetic material can be added to balance the null values in the desired locations.

Figure 5A:
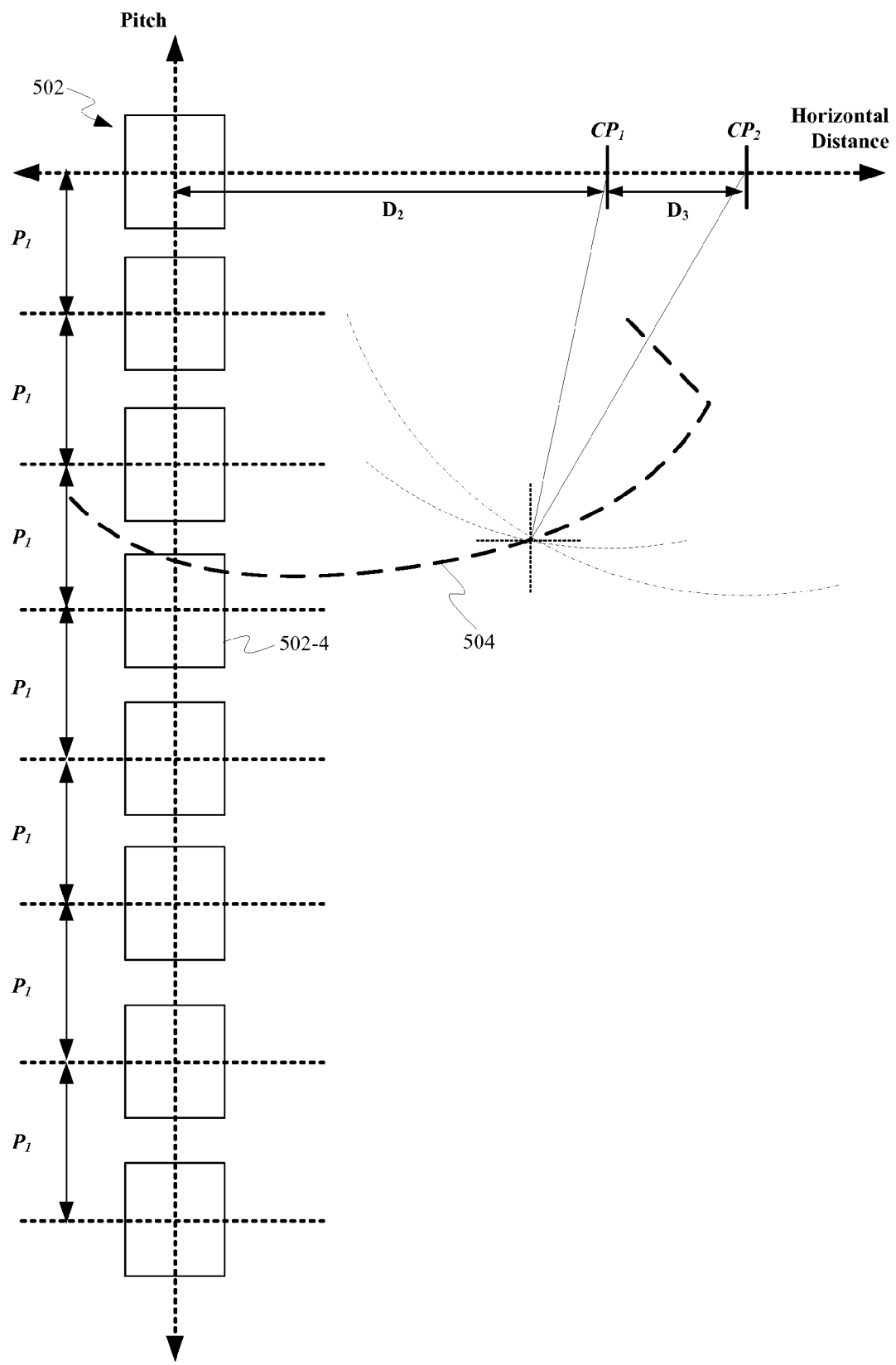
FIGS. 5A-5B shows a magnetic string and illustrates where a calculated balancing line indicates magnetic material can be added or subtracted to achieve two magnetic nulls.
Figure 5B:
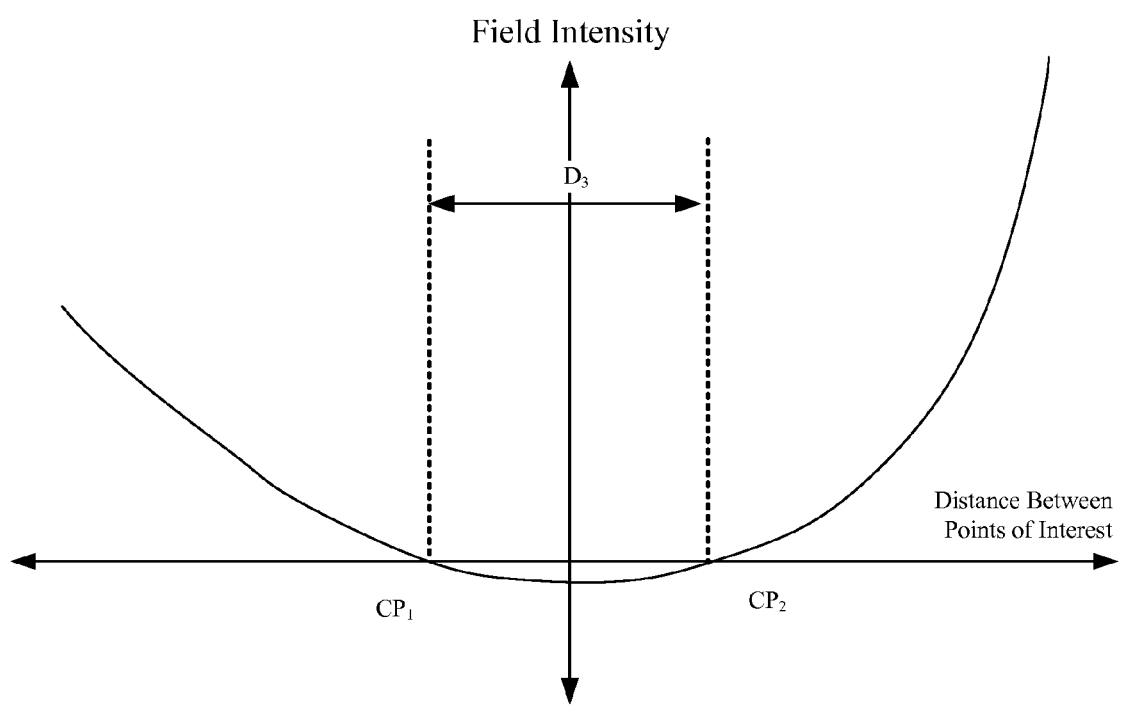

FIG. 5A illustrates where a balancing magnet or magnetic material can be added to the magnetic string made up of magnets 502 to achieve null values at the compass sensor location for the two magnetic string positions. The x-axis here shows how far the magnetic string is from each of the compass sensor locations illustrated by $CP_1$ and $CP_2$, the distance between the magnetic string and $CP_1$ being indicated as $D_2$ while the distance differential between $CP_1$ and $CP_2$ is indicated as $D_3$. The y-axis shows a pitch or distance between adjacent magnets in the magnetic string. Balancing line 504 can be calculated using Eq(2) and Eq(3) and can guide designers to determine where within accessory device 110 another magnet or additional magnetic material can be added to create locations of dual balancing in which the field intensities are near zero for both magnet string positions. It should be noted that the farther away from $CP_1$ and $CP_2$ the magnet or magnetic material is added the more magnetic material is required to achieve a balanced solution. For example, magnetic material added at the portion of balancing line 504 marked indicated by the cross would require substantially less material than adding the magnetic material to the portion of magnet 502-4 along the solution line. Addition of magnetic material at either location can help establish null values at the compass position for both magnetic string positions. FIG. 5B shows how when $CP_1$ and $CP_2$ coincide with locations of dual balancing both points are inherently and simultaneously balanced by adding a sufficient amount of magnetized magnetic material to a point along balancing line 504.

Figure 5C:
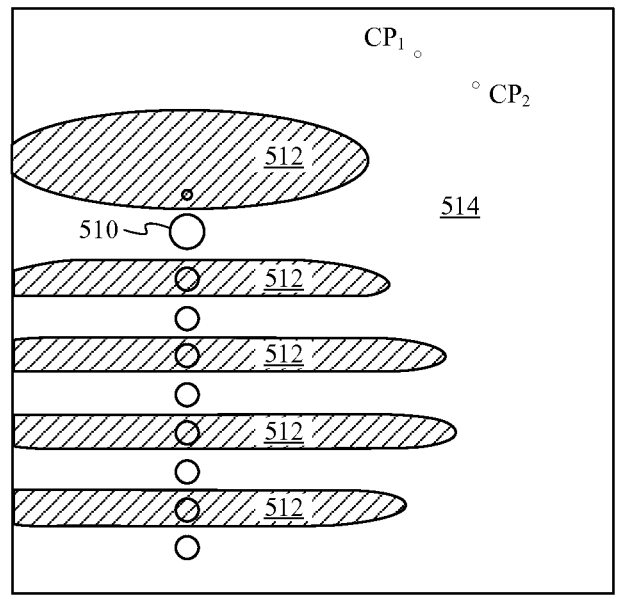
FIGS. 5C-5H show configuration shifts driven by adding a balancing magnet to the magnetic string in the case of both linear and non-linear magnetic string configurations.
Figure 5D:
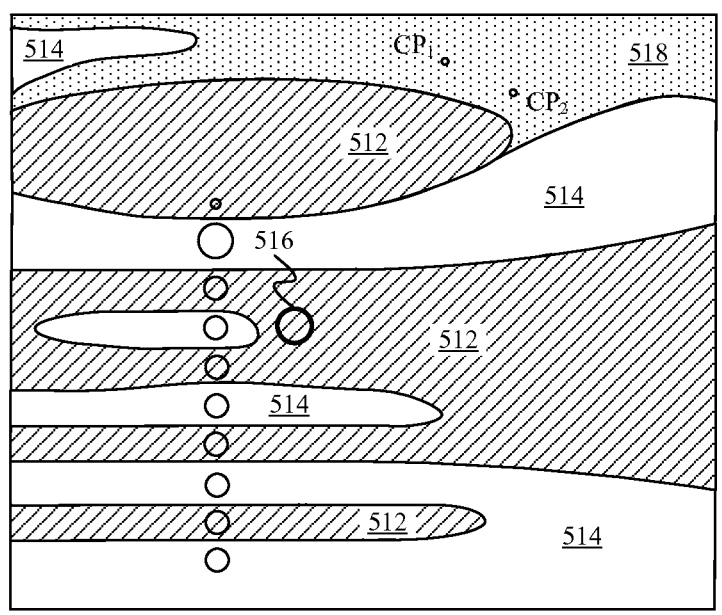
Figure 5E:
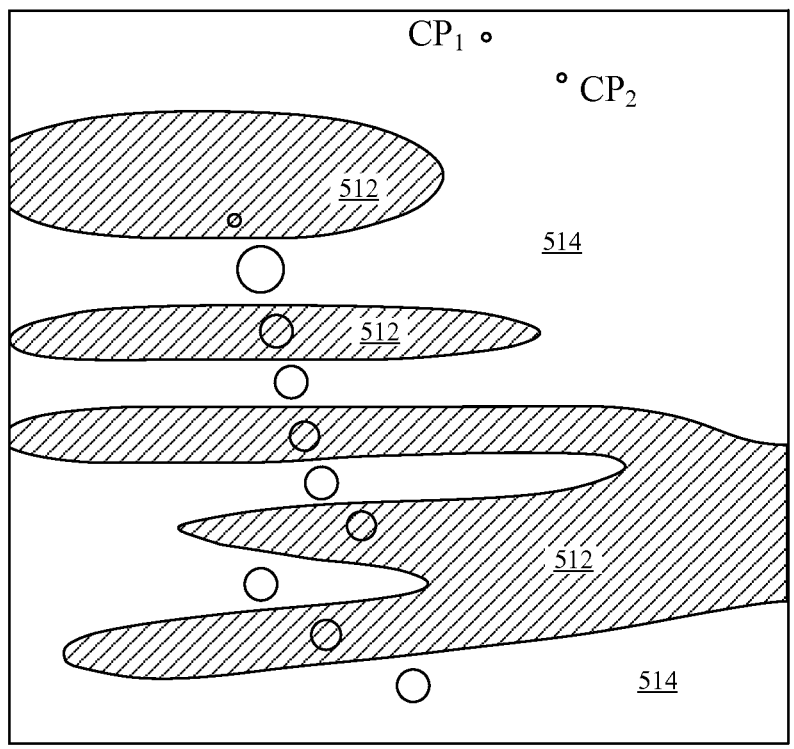
Figure 5F:
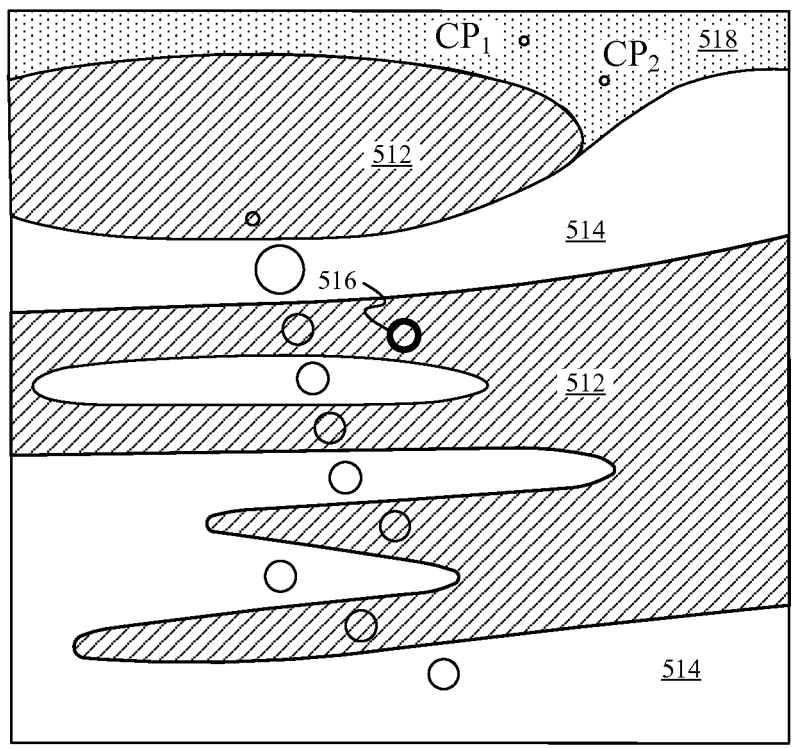
Figure 5G:
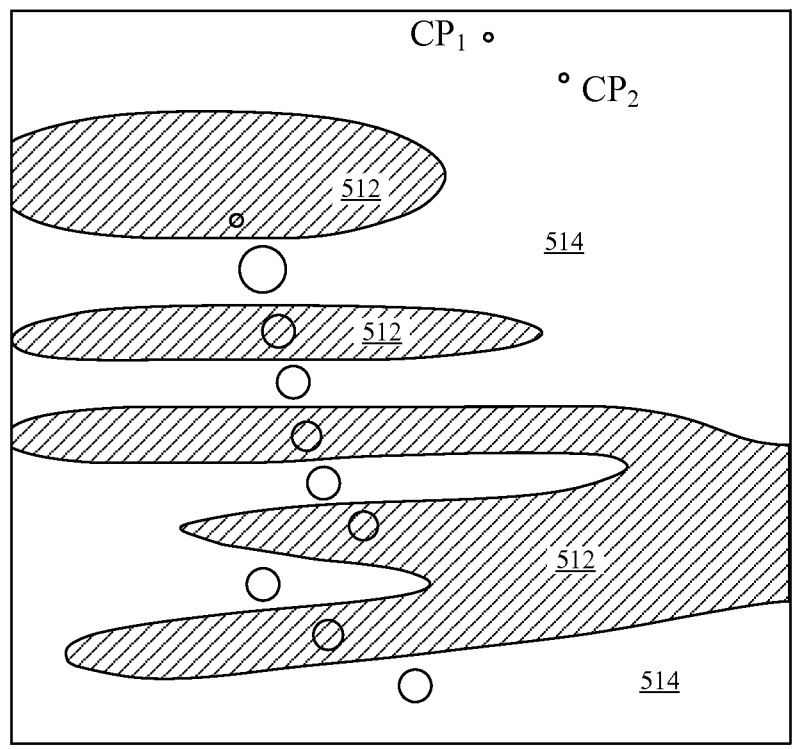
Figure 5H:
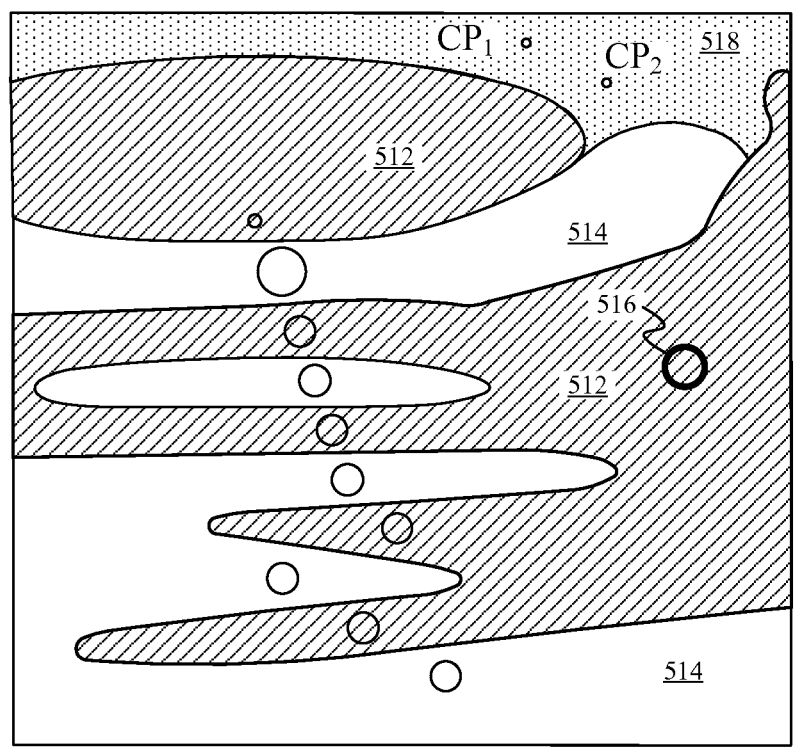

FIGS. 5C-5H show graphical representations of how a magnetic field can be adjusted by adding a balancing magnet to a magnetic string. FIG. 5C shows a magnetic field representation generated by a magnetic string arranged in a linear arrangement with alternating magnetic polarities. As depicted, the magnetic field has a substantially symmetric configuration due to the regular interval and magnetic polarity of magnets 510 making up the magnetic string. Regions 512 of the emitted magnetic field indicate positive field interference areas and region 514 indicates a negative field interference area. While both $CP_1$ and $CP_2$ are shown in a negative field interference area, it should be appreciated that the varying distance from the magnetic string causes a magnitude of the magnetic field to be greater at $CP_1$ than at $CP_2$. In FIG. 5D, by adding balancing magnet 516 to one side of the magnetic string an acceptably balanced area 518 can be created that coincides with both $CP_1$ and $CP_2$. A size and position of balancing magnet 516 can be determined as previously described in conjunction with FIGS. 5A-5B. FIG. 5E shows a representation of a magnetic string arranged in a non-linear arrangement. As shown in FIG. 5C the magnetic field includes no acceptably balanced areas 518. However, after adding balancing magnet 516, as shown in FIG. 5F, the non-linear magnetic string can be adjusted so that again an acceptably balanced area 518 can be established. FIG. 5G shows the same configuration depicted in FIG. 5E and FIG. 5H show how a different sized and positioned balancing magnet 516 can be utilized to establish acceptably balanced area 518 as depicted in FIG. 5H.

FIGS. 6A-6B show another way magnetic strings can be varied to adjust an emitted magnetic field and its properties. In particular FIGS. 6A-6B show two different configurations in which sizes, spacing and numbers of magnets 602 and 612 are adjusted while maintaining the same or substantially the same amount of magnetic material. $CP_1$ and $CP_2$ represent a distance between a magnetic string and a position of a magnetically sensitive component in a first configuration of accessory device 110 and a second configuration of accessory device 110 respectively. In FIG. 5A larger magnets 202 are spaced apart from each other at an interval of about half of the distance in the x-axis between the magnetic string and the compass. FIG. 6B shows a spacing that is half as large as the spacing used in FIG. 6B, while maintaining the same volume of magnetic material, by utilizing magnets 202 half the size of magnets 202 depicted in FIG. 5A spaced at half the interval. FIG. 6C shows a graph having two lines illustrating how the distribution of magnetic material affects a size of a null area of a magnetic field emitted from the configurations of magnets 202 depicted in FIGS. 6A and 6B. As depicted, the use of larger magnets with a larger interval therebetween results in a substantially smaller null range, which in turn reduces an upper limit of a difference between $CP_1$ and $CP_2$. The dashed arrows depicted in FIG. 6C show how for a magnetic field intensity maximum coincident with the arrows doubling the spacing doubles the sharpness/narrowness of the null region generated by a given magnetic string.

Figure 7:
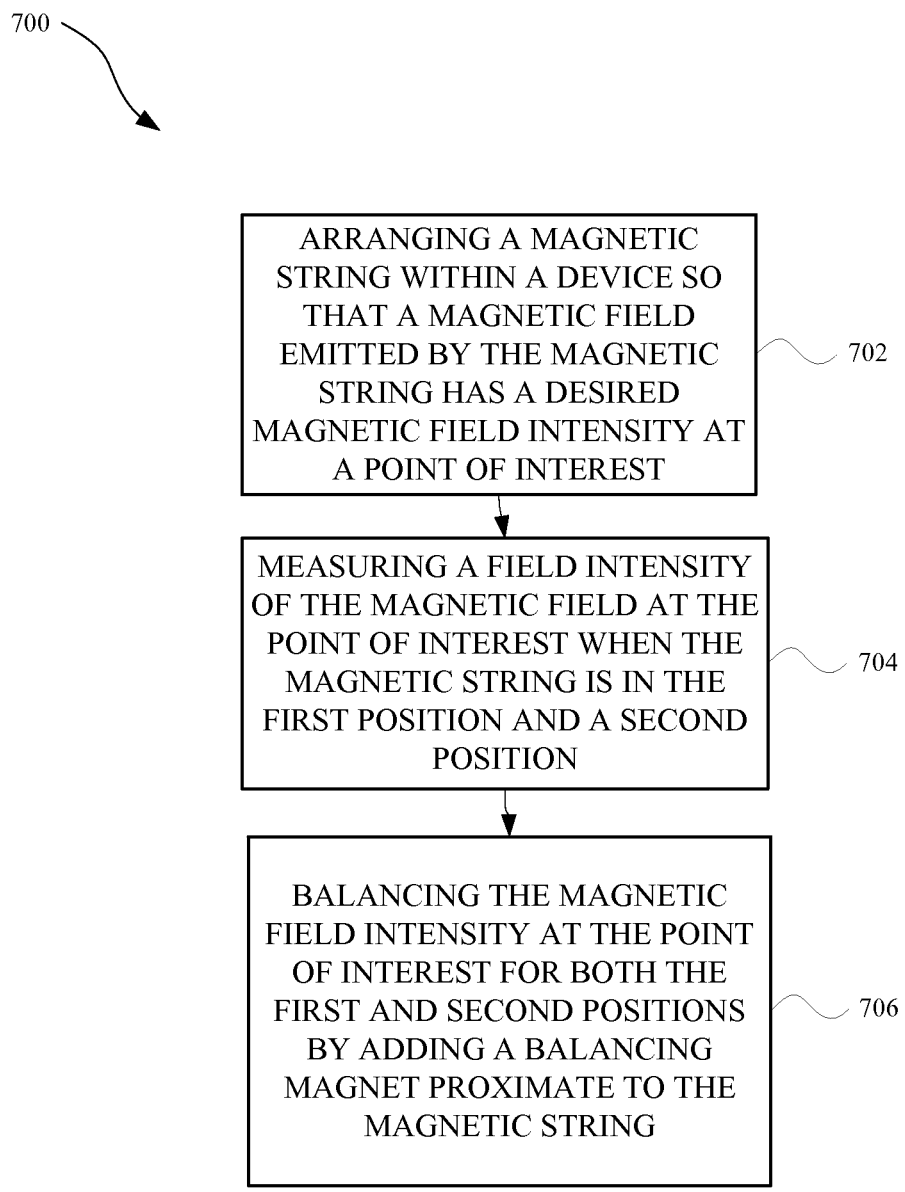
FIG. 7 shows a block diagram depicting a method for arranging magnets in an accessory device.

FIG. 7 shows a block diagram depicting a method for arranging magnets in an accessory device so that a null in a magnetic field emitted by the magnets coincides with a point of interest both before and after shifting a position of the magnets positioned in the accessory device from a first location to a second location. In some embodiments, a magnetically sensitive component can be positioned at the position of interest. At a first step 702 a number of magnets are arranged in a linear configuration with alternating polarity patterns within the device so that a magnetic field intensity at the point of interest is near zero when the magnets are in the first location. Various magnetic equations such as Eq(1) described above can be utilized to assist in arranging the magnets to achieve a desired field intensity at the point of interest. In some embodiments, addition or subtraction of magnetic material may be required to achieve the desired magnetic field intensity. At step 704 the magnetic intensity of the magnetic field emitted by the magnets at the point of interest for both the first and second locations of the magnets is determined. At step 706, Eq(3) can be used to calculate a position of a balancing line describing locations at which additional magnetic material can be added to the accessory device to balance the magnetic field intensities for both locations of the magnets. In some embodiments, a spacing and size of the magnets used in the accessory device can be reduced to increase a size of the magnetic nulls in the magnetic field emitted by the magnets. In this way, small variations in a position of the magnets within the accessory device can be accommodated by the larger magnetic nulls.

Figure 8:
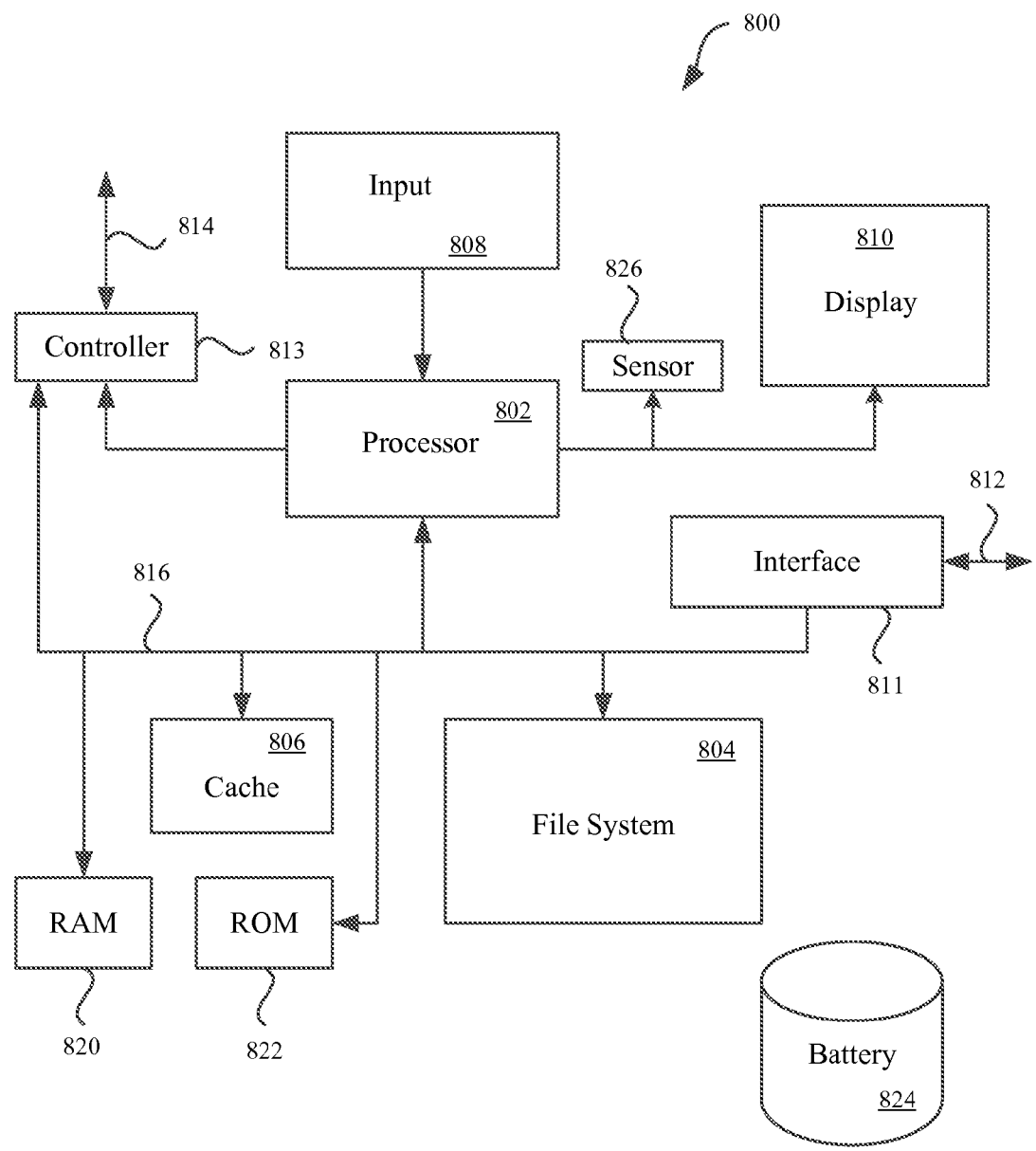
FIG. 8 is a block diagram of an electronic device suitable for controlling some of the processes in the described embodiment.

FIG. 8 is a block diagram of an electronic device suitable for controlling some of the processes in the described embodiment. Electronic device 800 can illustrate circuitry of a representative computing device. Electronic device 800 can include a processor 802 that pertains to a microprocessor or controller for controlling the overall operation of electronic device 800. Electronic device 800 can include instruction data pertaining to operating instructions in a file system 804 and a cache 806. File system 804 can be a storage disk or a plurality of disks. In some embodiments, file system 804 can be flash memory, semiconductor (solid state) memory or the like. The file system 804 can typically provide high capacity storage capability for the electronic device 800. However, since the access time to the file system 804 can be relatively slow, the electronic device 800 can also include cache 806. The cache 806 can include, for example, Random-Access Memory (RAM) provided by semiconductor memory. The relative access time to the cache 806 can substantially shorter than for the file system 804. However, cache 806 may not have the large storage capacity of file system 804. Further, file system 804, when active, can consume more power than cache 806. Power consumption often can be a concern when the electronic device 800 is a portable device that is powered by battery 824. The electronic device 800 can also include a RAM 820 and a Read-Only Memory (ROM) 822. The ROM 822 can store programs, utilities or processes to be executed in a non-volatile manner. The RAM 820 can provide volatile data storage, such as for cache 806.

Electronic device 800 can also include user input device 808 that allows a user of the electronic device 800 to interact with the electronic device 800. For example, user input device 808 can take a variety of forms, such as a button, keypad, dial, touch screen, audio input interface, visual/image capture input interface, input in the form of sensor data, etc. Still further, electronic device 800 can include a display 810 (screen display) that can be controlled by processor 602 to display information to the user. Data bus 816 can facilitate data transfer between at least file system 804, cache 806, processor 802, and controller 813. Controller 813 can be used to interface with and control different manufacturing equipment through equipment control bus 814. For example, control bus 614 can be used to control a computer numerical control (CNC) mill, a press, or other display devices. For example, processor 802, upon a certain manufacturing event occurring, can supply instructions to control an alternate display through controller 813 and control bus 814. Such instructions can be stored in file system 804, RAM 820, ROM 822 or cache 806.

Electronic device 800 can also include a network/bus interface 811 that couples to data link 812. Data link 812 can allow electronic device 800 to couple to a host computer or to accessory devices. The data link 812 can be provided over a wired connection or a wireless connection. In the case of a wireless connection, network/bus interface 811 can include a wireless transceiver. Sensor 826 can take the form of circuitry for detecting any number of stimuli. For example, sensor 826 can include any number of sensors for monitoring such as, for example, a Hall Effect sensor responsive to external magnetic field, an audio sensor, a light sensor such as a photometer and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A device, comprising:
   a substrate comprising a first portion configured to rotatably move with respect to a second portion about a hinge line from a first position to a second position; and
   a magnetic string coupled directly to the first portion and comprising a number of magnets oriented so that adjacent magnets of the magnetic string have polarities oriented in opposite directions,
   wherein an intensity of a magnetic field emitted by the magnetic string is substantially the same at a fixed location external to the substrate when the first portion is in either the first position or the second position.

2. The device as recited in claim 1, wherein the fixed location coincides with a location of a magnetically sensitive component disposed within an electronic device to which the device is configured to be attached.

3. The device as recited in claim 2, wherein the intensity of the magnetic field at the fixed location is below a threshold at which the magnetically sensitive component is not adversely effected.

4. The device as recited in claim 2, wherein the magnets of the magnetic string are arranged in a linear configuration oriented substantially parallel with the hinge line, which separates the first portion from the second portion.

5. The device as recited in claim 1, wherein a distance between the magnetic string and the fixed location in the first position is substantially different than a distance between the magnetic string and the fixed location in the second position.

6. The device as recited in claim 1, further comprising a balancing magnet coupled to the first portion and offset from the magnetic string, the balancing magnet causing a portion of the magnetic field that coincides with the fixed location to have substantially the same magnetic field strength in both the first position and the second position.

7. The device as recited in claim 1, wherein the first portion comprises a rigid segment that keeps substantially all of the first portion in a single plane.

8. The device as recited in claim 7, wherein the second portion comprises another rigid segment that cooperates with the rigid segment of the first portion to define the hinge line.

9. An apparatus suitable for attachment to an electrical device, the apparatus comprising:
   a flap, comprising:
      a first portion comprising a rigid segment and a number of magnets oriented in an alternating polarity pattern along the rigid segment, and
      a second portion separated from the first portion by a hinge line, the first portion pivoting with respect to the second portion along the hinge line,
   wherein an intensity of a magnetic field emitted by the magnets is substantially the same in a location that correspond to a magnetically sensitive component disposed within the electrical device when the first portion is in either a first position or a second position angularly offset from the first position.

10. The apparatus as recited in claim 9, wherein in the first position the first portion is coplanar with the second portion.

11. The apparatus as recited in claim 9, wherein the first portion rotates about 180 degrees to reach the second position from the first position.

12. The apparatus as recited in claim 9, wherein an intensity of the magnetic field does not adversely affect the magnetically sensitive component.

13. The apparatus as recited in claim 9, wherein the magnets are arranged in a substantially linear pattern.

14. The device as recited in claim 13, wherein the linear pattern of magnets is arranged substantially parallel to the hinge line.

15. A consumer electronic product, comprising:
   an electronic device comprising a magnetically sensitive component overlaid by a protective cover; and
   a flexible flap pivotally coupled with the electronic device, the flexible flap including a first portion separated from a second portion by a hinge line, the second portion including an arrangement of magnets having alternating polarities,
   wherein when the first and second portions of the flexible flap are flat against the protective cover of the electronic device an intensity of a magnetic field emitted by the linear arrangement of magnets at the magnetically sensitive component is substantially the same as the intensity at the magnetically sensitive component when the second portion of the flap is rotated away from the protective cover along the hinge line and contacts the first portion of the flexible flap.

16. The consumer electronic product as recited in claim 15, wherein the linear arrangement of magnets is oriented substantially parallel with the hinge line.

17. The consumer electronic product as recited in claim 15, wherein a distance between the linear arrangement of magnets and the magnetically sensitive component when the flexible flap is flat against the protective cover is substantially different than a distance between the linear arrangement of magnets and the magnetically sensitive component when the flexible flap contacts the first portion of the flexible flap.

18. The consumer electronic product as recited in claim 15, wherein the hinge line is substantially offset from the magnetically sensitive component.

19. The consumer electronic product as recited in claim 15, wherein the magnetically sensitive component is a compass.

* * * * *